Figure 1:
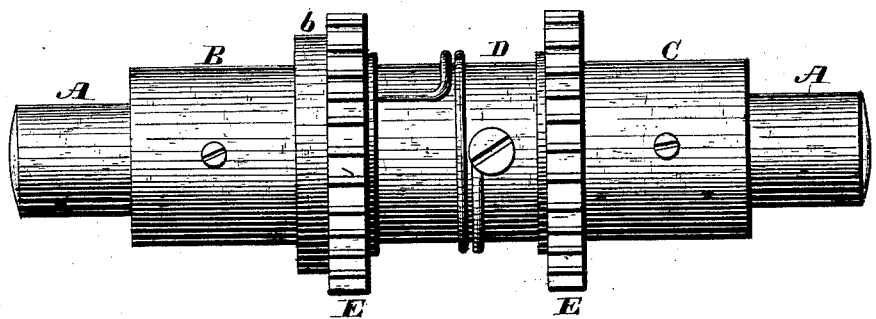

(Model.)

2 Sheets—Sheet 1.

T. COLTMAN.
Apparatus for Stopping, Connecting, and Disconnecting Shafts.

No. 232,241. Patented Sept. 14, 1880.

Attest:
J. Henry Kaiser
J. A. Rutherford

Inventor
Thomas Coltman
By James L. Norris
Atty.

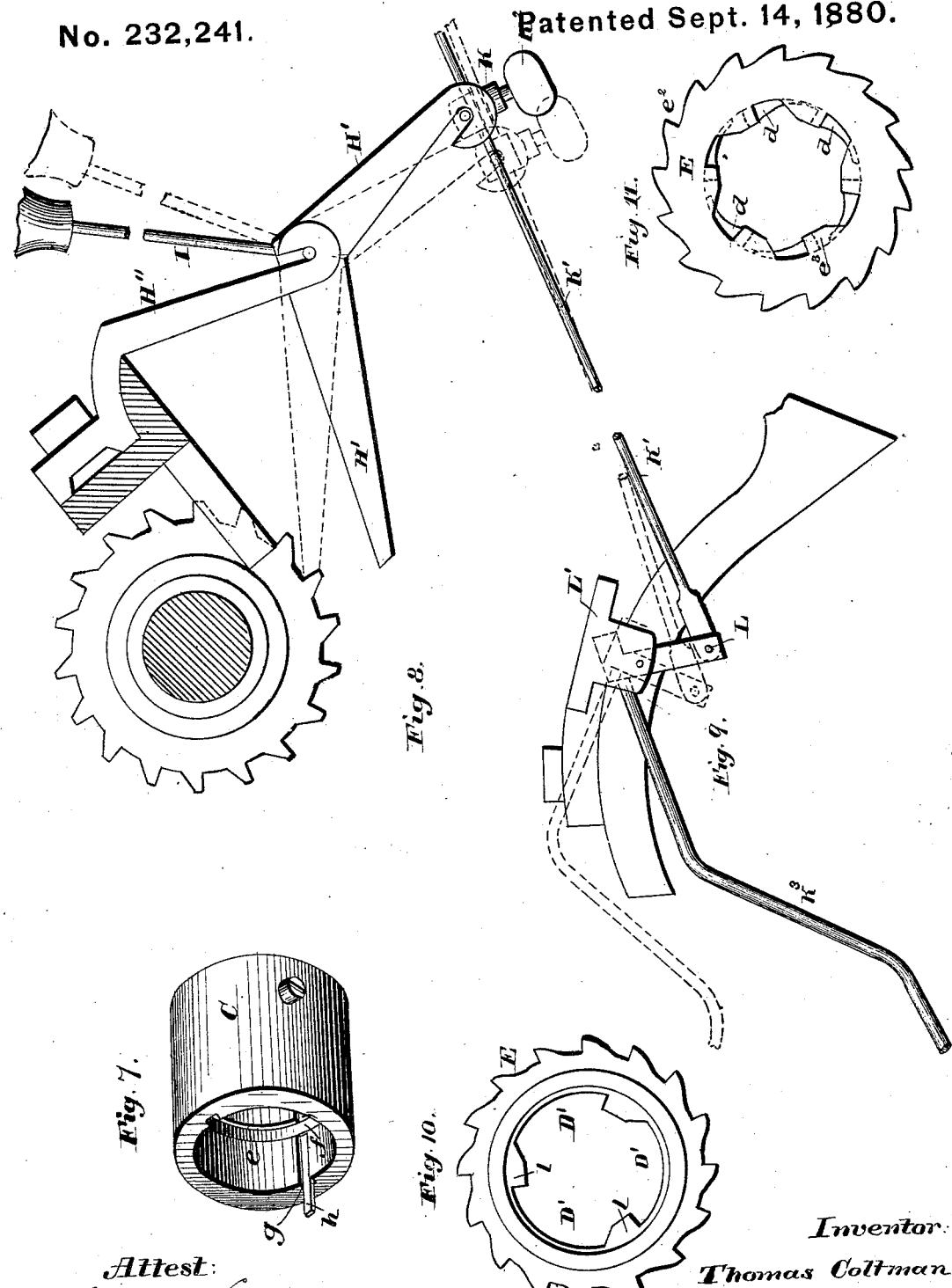

UNITED STATES PATENT OFFICE.

THOMAS COLTMAN, OF LEICESTER, ENGLAND.

APPARATUS FOR STOPPING, CONNECTING, AND DISCONNECTING SHAFTS.

SPECIFICATION forming part of Letters Patent No. 232,241, dated September 14, 1880.

Application filed August 7, 1880. (Model.) Patented in Great Britain May 3, 1879.

*To all whom it may concern:*

Be it known that I, THOMAS COLTMAN, of Leicester, England, have invented new and useful Improvements in Devices or Apparatus to be applied to Machine-Shafting for Stopping, Disconnecting, or Connecting the same, (for which I have obtained a patent in Great Britain, No. 1,749, bearing date 3d May, 1879,) of which the following is a specification.

The invention consists, first, in mechanism for connecting or disconnecting the opposing ends of two shafts which are in line with each other, and two fixed collars secured upon said shafts near their adjacent ends, in combination with a loose collar arranged upon the opposing ends of the shafts and between the fixed collars, one of said fixed collars being formed with an internal line of inclines, the remaining fixed collar being provided with a projecting arm or driving-pin secured to the collar by an interiorly-arranged ring-spring, and the loose collar being provided with a like driving-pin held by a ring-spring and projecting out from one end of said collar to engage with the inclines of one of the fixed collars, said loose collar being also formed with an interior line of inclines, with which the driving-pin of the remaining fixed collar engages; second, in the combination, with the two shafts, of a fixed collar secured upon one shaft and provided with a driving-pin held to the collar by an internally-arranged ring-spring, a loose collar arranged upon the ends of the shafts alongside of the fixed collar and formed with an interior line of inclines, with which the driving-pin of the fixed collar engages, a ratchet-wheel formed with outer and inner lines of teeth and with a stud or pin upon its inner face, said ratchet-wheel being loosely arranged upon the loose collar with its stud extending into a notch in the loose collar, so as to couple the two together and limit the movement of the ratchet upon the collar, said parts being arranged so that when the ratchet is held against rotation its inner teeth will be in front of the spaces between the inclines of the loose collar, thus forcing the spring driving-pin out from said spaces and causing it to travel over both the said teeth and inclines; third, in the combination, with a pawl or clawker, of the two shafts in line with each other, the fixed collar secured upon one shaft and having a projecting driving-pin held with the collar by a ring-spring, a fixed collar secured upon the remaining shaft and having a line of internally-arranged inclines at one of its ends, a loose collar arranged upon the adjacent ends of the shafts between the fixed collars and provided with a spring driving-pin engaging with the inclines of one fixed collar, and also having an internal line of inclines, with which the spring driving-pin of the remaining fixed collar engages, and two ratchet-wheels arranged loosely upon the loose collar and having a limited rotary movement thereon, all substantially as hereinafter more fully described.

Figure 2:
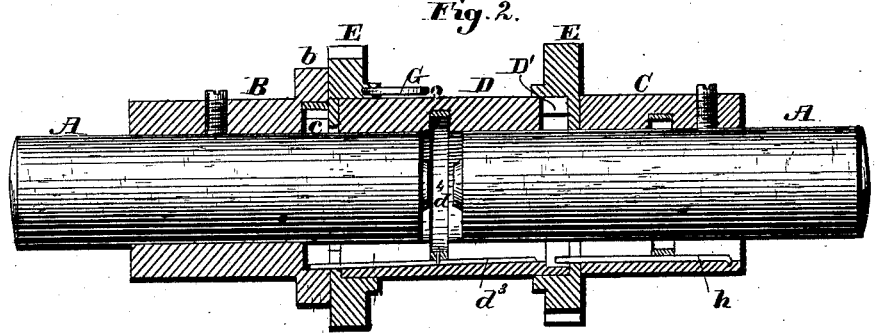
Figure 3:
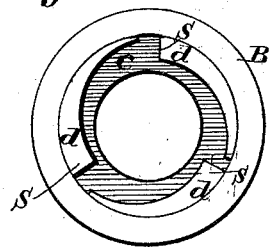
Figure 4:
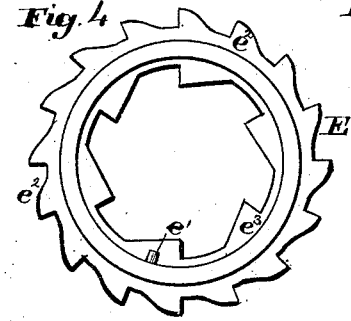
Figure 5:
Figure 6:
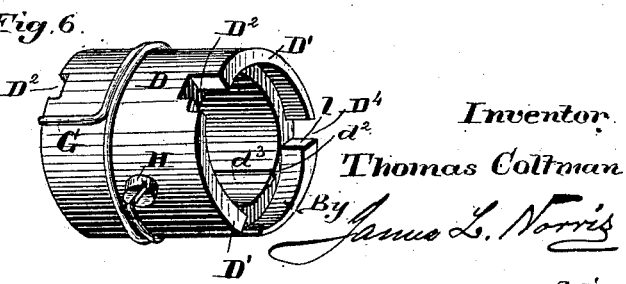

Figure 1 is a side view of the ends of two shafts provided with my improved stop mechanism. Fig. 2 is a longitudinal section. Fig. 3 is an end view of the collar B, which is secured upon one of the shafts. Fig. 4 is an end view of one of the ratchets. Fig. 5 is a section taken through the ratchet shown in Fig. 4. Fig. 6 is a perspective view of the loose collar hereinafter particularly described. Fig. 7 is a perspective view of the collar C, which is secured to one of the shafts. Fig. 8 represents a pawl or clawker and a ratchet-wheel, and Fig. 9 a side view of a portion of a device connected with the pawl above mentioned. Fig. 10 illustrates a ratchet-wheel in which the inner teeth are farther apart than in the ratchet-wheels arranged upon the loose collar. Fig. 11 is a view illustrating the relative position of the inner inclines of a ratchet-wheel and the inclines of one of the collars when the transmission of motion from one shaft to another is checked, as hereinafter explained, the inclines of the collar being shown in part by dotted lines.

A A designate the ends of two shafts, upon the end of one of which is secured a collar, B, and upon the other a collar, C.

The collar B is formed at one end with a circumferential flange, *b*, and recessed, as at *c*, so as to provide space for a series of inclines, *d*, which are illustrated in Fig. 3.

The collar C (shown more clearly in the perspective view, Fig. 7) is formed with an internal annular groove, *e*, which receives a circular or ring spring, *f*. This collar is also provided with an internal longitudinal groove, *g*, in which is placed a flat pin or bar, *h*, said pin being designated as a driving-pin. The pin is passed under the spring $f$, which holds it in place.

The letter D designates a collar, which is loosely mounted upon the adjacent ends of the shafts A, and arranged between the collars B C, as shown in Figs. 1 and 2. This loose collar D is formed with an internal annular groove and an internal longitudinal groove, $d^2$, similarly to the collar C, before described, and it is further provided with a driving-pin, $d^3$, which is held in place by a circular spring, $d^4$, which fits in the annular groove, the same as in the case of the said collar C. This driving-pin projects from one end of the collar D, so that when the parts are in the position shown in Fig. 2 the outer end of said driving-pin will extend into the recess $c$ in the inner end of the fixed collar B.

The end of the loose collar D, which is opposite the end from which the driving-pin projects is reduced in thickness at certain points, so as to form the inclines D', which are similar in character to the inclines of the fixed collar B. Upon the ends of the loose collar D are arranged ratchets E, which are coupled with the said collar by studs $e'$, formed to project into notches or recesses $D^2$ at the ends of the collar, the said notches or recesses admitting of a certain extent of play in a rotary direction of the ratchets upon the loose collar. The loose collar is also provided with a spring, G, coiled around it and secured at one end to a stud, H, and at its remaining end inserted into an aperture in one of the ratchets E. The parts being arranged in place, as in Figs. 1 and 2, the driving-pin $d^3$ of the loose collar will extend through a ratchet into the recess $c$ in the inner end of the fixed collar B, and the driving-pin $h$ of the fixed collar C will extend through one of the ratchets into one of the spaces between the inclines D' of the loose collar D.

It will be seen that these ratchets each consist of a ring having an outer line of ratchet-teeth, $e^2$, and an inner series of ratchet-teeth or inclines, $e^3$, said inner line of inclines being near one end of the ratchet, so as to admit of its being fitted upon the loose collar.

When either one of the shafts is rotated a like rotation will be imparted to the remaining shaft, since both will be coupled together by means of the driving-pin $h$ of the collar C fitting in one of the recesses between the inclines of the collar D and acting against one of the shoulders $l$, formed by the inclines, and also by reason of the driving-pin $d^3$ of the collar D fitting in a like recess between and acting against a like shoulder of one of the inclines $d$ of the fixed collar B.

In order to uncouple or disconnect one shaft from the other, so as to check the rotary movement thus transmitted from one shaft to the other, I provide the following means: H' is a pawl, which I denominate a "clawker," and which is fulcrumed in the lower slotted end of a forked bracket, H'', a side view of which is herein shown. The lower end of this clawker will be forked and slotted to form bearings for a swiveled center block, K, having a set-screw, $K^2$, by which it can be adjusted upon a rod, K', a portion of which rod is shown in Fig. 8. The forward end of this rod is, as shown in Fig. 9, hinged to the forked lower end of a rocking lever, L, which turns on an axle secured in the fork of a bearing-bracket, L', which may be attached to any convenient surface near the bearings of the shafts. The upper end of the rocking lever L carries a rod, $K^3$, which may be either bent or straight, and which, preferably, will have its front end turned at a right angle to its length, so as to be readily retained by a catch or stud conveniently placed, so that when the rod is caught by such device the clawker will be depressed and assume the position shown by full lines in Fig. 8, and hence be free from the ratchet. Immediately an attendant releases the rod $K^3$ from a retaining catch or stud the weighted rod I overbalances and lifts the front end of the clawker H' into the teeth of the ratchet-wheel, as shown by dotted lines, Fig. 8, which wheel is thus suddenly arrested in the revolutions with the loose collar.

As before stated, the ratchets both have a limited rotary play upon the loose collar, such movement being limited by the walls of the recess in which the stud $e'$ of the ratchet operates. Hence if, for instance, the ratchet E next to the collar C is checked by the clawker, the pin $h$, still acting against the shoulder $l$ of the loose collar D, will still carry the loose collar round until the inclines of the ratchet and the inclines of the collar assume the position shown in Fig. 10, and then the inclines of the ratchet will raise the driving-pin out of the recesses and over the shoulders $l$ of the inclines of the collar D. In this way, while such shaft rotates, the collar, ratchets, and next shaft will remain stationary, since the driving-pin passes over the inclines of the loose collar, and also over the inclines or inner ratchet-teeth of the ratchet-wheel, said teeth being now in front of the spaces between the ends of the inclines D', and thereby preventing the driving-pin from entering such spaces, so as to set against the shoulders $l$, formed by said inclines. The width of the recess $D^2$ is such that when the ratchet is thus arrested its pin $e'$, which projects in said recess, will check the rotation of the loose collar so soon as the inner ratchet-teeth, $e^3$, are in front of the spaces between the inclines D' of the loose collar.

After the clawker is released from the ratchet the ring-spring will force the driving-pin in a direction out from the shaft, so that it will, by acting against the inclined surface of one of the inner ratchet-teeth, $e^3$, cause the ratchet-wheel to turn slightly upon the loose collar, thereby admitting of the pin being further forced by the spring into one of the spaces or recesses between the inclines D'.

The object of the spring G, hereinbefore described, is to relieve the ratchet-wheel from the pressure of the driving-pin carried by the loose collar during the driving of the shafts, said spring, after the clawker is freed from the ratchet, having a tendency to restore the ratchet to its normal position, from which it will only be moved by the engagement of the clawker therewith in the manner above mentioned.

It is understood that the action incident to the engagement of a clawker, such as above described, with the ratchet next to the collar B is similar to that just described in connection with the ratchet next to collar C, the only difference being that in one instance the driving-pin is carried by the loose collar, so as to engage with inclines of the fixed collar B, instead of being carried by a fixed collar and arranged to engage with inclines of the loose collar.

When a clawker engages the ratchet next to said collar B the ratchet-teeth will prevent the pin $d^3$ from entering the spaces between the inclines $d$, in the same manner as described in connection with the other ratchet, and after the clawker is released from said ratchet the spring G will turn the ratchet slightly, so as to leave the passage for the driving-pin to said spaces open, and also hold the inner ratchet-teeth out of the way of the driving-pin, which is left free to act against the shoulders S, formed by the inclines $d$ of the collar B.

Where the inner teeth of the ratchet are far apart, as in Fig. 10, the inclines of the collars will, of course, be made longer.

The devices connected with the clawker, as hereinbefore described, may be dispensed with and any other means suitable for operating the pawl or clawker employed.

As a modification of the above, I may secure a collar provided with a ring-spring and driving-pin, as before described, to the driving-pulley of the machine or engine required to be stopped, said collar running loose on the shaft with the pulley. To one end of the said collar running loose on the shaft with the pulley I place a ratchet-wheel, the internal inclines of which lie between the said collar and a second collar provided with inclines and secured to the shaft, so that the driving-pin of the first collar will act upon the inclines of the second fixed collar. The ratchet in this case has a pin, and the collar a recess to receive it, as the devices already described.

What I claim is—

1. As a means for connecting or disconnecting shafting, the collars B C, secured to two adjacent shafts, in combination with the loose collar D, the collar B being formed with inclines $d$, the collar C being provided with an internal ring-spring and with a driving-pin, $h$, and the collar D being provided with a like ring-spring and a driving-pin, and having the inclines D' formed at one of its ends, all connected and adapted for operation substantially as set forth.

2. The combination, with the shafts A, of the collar C, provided with a driving-pin held in place by a ring-spring, the collar D, formed with the inclines D' at one of its ends, and also with the notches $D^2$, and the ratchet E, fitted upon said collar and formed with the outer teeth, $e^2$, the inner teeth, $e^3$, and the pin $e'$, projecting into the notch $D^2$, all constructed and arranged substantially as specified.

3. The combination, with the clawker, of the shafts A, the collar C, with a driving-pin held within the same by a ring-spring, the collar B, with the inclines $d$ at one end, the loose collar D, with a driving-pin, $d^3$, held in place by a ring-spring, $d^4$, and projecting from one end of said collar to engage the inclines $d$, the inclines D' at the other end of said loose collar, and the ratchets E, arranged upon the collar D, all substantially in the manner specified.

THOMAS COLTMAN.

Witnesses:
H. W. GOUGH, C. E.,
STEPHEN P. ENKE.